(12) United States Patent
Mullen

(10) Patent No.: US 12,197,984 B1
(45) Date of Patent: *Jan. 14, 2025

(54) SYSTEMS AND METHOD FOR ANTI-SKIMMING RFID TOPOLOGIES

(71) Applicant: Dynamics Inc., Cheswick, PA (US)

(72) Inventor: Jeffrey D. Mullen, Glenshaw, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,803

(22) Filed: Sep. 5, 2018

Related U.S. Application Data

(63) Continuation of application No. 13/361,483, filed on Jan. 30, 2012, now Pat. No. 10,095,970.

(60) Provisional application No. 61/437,813, filed on Jan. 31, 2011.

(51) Int. Cl.
| | | |
|---|---|---|
| *G06K 19/073* | (2006.01) | |
| *G06K 7/08* | (2006.01) | |
| *G06K 19/06* | (2006.01) | |
| *G06K 19/07* | (2006.01) | |
| *G06K 19/077* | (2006.01) | |
| *G06Q 20/34* | (2012.01) | |

(52) U.S. Cl.
CPC ....... *G06K 19/07345* (2013.01); *G06K 7/087* (2013.01); *G06K 19/06112* (2013.01); *G06K 19/06196* (2013.01); *G06K 19/0702* (2013.01); *G06K 19/07709* (2013.01); *G06Q 20/3572* (2013.01)

(58) Field of Classification Search
CPC ....... G06K 19/07345; G06K 19/06196; G06K 7/087; G06K 19/06112; G06K 19/07709; G06K 19/0702; G06Q 20/3572
See application file for complete search history.

(56) References Cited

U.S. PATENT DOCUMENTS

| | | | |
|---|---|---|---|
| 4,353,064 | A | 10/1982 | Stamm |
| 4,394,654 | A | 7/1983 | Hofmann-Cerfontaine |
| 4,614,861 | A | 9/1986 | Pavlov et al. |
| 4,667,087 | A | 5/1987 | Quintana |
| 4,701,601 | A | 10/1987 | Francini et al. |
| 4,720,860 | A | 1/1988 | Weiss |
| 4,786,791 | A | 11/1988 | Hodama |
| 4,791,283 | A | 12/1988 | Burkhardt |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Matthew Smithers
(74) *Attorney, Agent, or Firm* — Morris Law Group; Robert W Morris

(57) ABSTRACT

A card, such as a payment card, or other device may include an electronics package. The electronics package may include an RFID antenna. The RFID may not be utilized to access data on the card, or other device, until the appropriate manual input is received into the card or other device. Such manual input may take the form of a manual press of a physical button or the manual activation of a virtual button on a touch-screen device (e.g., a touch-screen mobile phone or card).

18 Claims, 7 Drawing Sheets

(56) References Cited

U.S. PATENT DOCUMENTS

| | | |
|---|---|---|
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 * | 2/2008 | Palmer ............... G06Q 20/327 713/186 |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,432,816 B1 | 10/2008 | Ku et al. |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |

(56) References Cited

U.S. PATENT DOCUMENTS

| | | |
|---|---|---|
| D652,867 S | 1/2012 | Mullen et al. |
| D653,288 S | 1/2012 | Mullen et al. |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,253,568 B2 | 8/2012 | Choi |
| 8,253,569 B2 | 8/2012 | Choi |
| 8,282,007 B1 | 10/2012 | Cloutier et al. |
| 8,286,876 B2 | 10/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| 8,322,624 B2 | 12/2012 | Finn |
| D674,013 S | 1/2013 | Mullen et al. |
| 8,348,172 B1 | 1/2013 | Cloutier et al. |
| 8,382,000 B2 | 2/2013 | Mullen et al. |
| 8,390,456 B2 | 3/2013 | Puleston et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| 8,485,437 B2 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,585,850 B2 | 11/2013 | Muirhead |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,820,638 B1 | 9/2014 | Cotter et al. |
| 8,875,999 B2 | 11/2014 | Mullen et al. |
| 8,881,989 B2 | 11/2014 | Mullen et al. |
| 8,931,703 B1 | 1/2015 | Mullen et al. |
| 8,944,333 B1 | 2/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,053,398 B1 | 6/2015 | Cloutier |
| 9,064,255 B1 | 6/2015 | Mullen et al. |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,639,796 B2 | 5/2017 | Mullen et al. |
| 9,646,240 B1 | 5/2017 | Mullen et al. |
| 9,652,436 B1 | 5/2017 | Yen et al. |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,721,201 B1 | 8/2017 | Mullen et al. |
| 9,727,813 B2 | 8/2017 | Mullen et al. |
| 9,805,297 B2 | 10/2017 | Mullen et al. |
| 9,852,368 B1 | 12/2017 | Yen et al. |
| 9,875,437 B2 | 1/2018 | Cloutier et al. |
| 9,928,456 B1 | 3/2018 | Cloutier et al. |
| 9,953,255 B1 | 4/2018 | Yen et al. |
| 10,022,884 B1 | 7/2018 | Cloutier |
| 10,032,100 B2 | 7/2018 | Mullen et al. |
| 10,055,614 B1 | 8/2018 | Cloutier et al. |
| 10,095,970 B1 * | 10/2018 | Mullen ............ G06K 19/06196 |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,176,423 B1 | 1/2019 | Mullen et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,504,105 B2 | 12/2019 | Mullen et al. |
| 10,579,920 B2 | 3/2020 | Mullen et al. |
| 10,693,263 B1 | 6/2020 | Mullen et al. |
| 10,948,964 B1 | 3/2021 | Cloutier |
| 10,997,489 B2 | 5/2021 | Mullen et al. |
| 11,062,195 B2 | 7/2021 | Mullen |
| 11,144,909 B1 | 10/2021 | Mullen et al. |
| 11,238,329 B2 | 2/2022 | Mullen et al. |
| 11,494,606 B2 | 11/2022 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0118930 A1 | 6/2004 | Berardi |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0040242 A1 | 2/2005 | Beenau |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0207624 A1 | 9/2005 | Ehlers et al. |
| 2005/0228959 A1 | 10/2005 | D'Albore et al. |
| 2005/0274794 A1 | 12/2005 | Bason et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0109119 A1 | 5/2006 | Burr et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |

(56) References Cited

U.S. PATENT DOCUMENTS

| | | |
|---|---|---|
| 2007/0152072 A1 | 7/2007 | Frallicciardi et al. |
| 2007/0152829 A1 | 7/2007 | Lindsay et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0200682 A1* | 8/2007 | Colby .................. G06K 19/025 340/10.51 |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0273519 A1 | 11/2007 | Ichikawa et al. |
| 2007/0291753 A1 | 12/2007 | Romano |
| 2008/0005510 A1 | 1/2008 | Sepe et al. |
| 2008/0007408 A1* | 1/2008 | Hwang .................. E05D 11/00 340/572.1 |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0055093 A1 | 3/2008 | Shkolnikov et al. |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0072423 A1 | 3/2008 | Finn |
| 2008/0074269 A1 | 3/2008 | Torchalski et al. |
| 2008/0094220 A1 | 4/2008 | Foley et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2008/0308641 A1 | 12/2008 | Finn |
| 2008/0309463 A1 | 12/2008 | Godzwon |
| 2009/0013122 A1 | 1/2009 | Sepe et al. |
| 2009/0036147 A1 | 2/2009 | Romano |
| 2009/0045960 A1 | 2/2009 | Von Gutfeld |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0170432 A1 | 7/2009 | Lortz |
| 2009/0191811 A1 | 7/2009 | Griffin et al. |
| 2009/0210308 A1 | 8/2009 | Toomer et al. |
| 2009/0222383 A1 | 9/2009 | Tato et al. |
| 2009/0234472 A1 | 9/2009 | Pyle |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0023449 A1 | 1/2010 | Skowronek et al. |
| 2010/0026468 A1 | 2/2010 | Nyalamadugu et al. |
| 2010/0078472 A1 | 3/2010 | Lin et al. |
| 2010/0123561 A1 | 5/2010 | Nam et al. |
| 2010/0123583 A1 | 5/2010 | Bommer et al. |
| 2010/0153269 A1 | 6/2010 | McCabe |
| 2010/0207737 A1 | 8/2010 | Park et al. |
| 2010/0223479 A1 | 9/2010 | Nguyen et al. |
| 2010/0263179 A1 | 10/2010 | Boldin |
| 2010/0295286 A1 | 11/2010 | Goldstein et al. |
| 2010/0304670 A1 | 12/2010 | Shuo |
| 2010/0308964 A1 | 12/2010 | Ackley et al. |
| 2011/0028184 A1 | 2/2011 | Cooper |
| 2011/0060691 A1 | 3/2011 | Grossman |
| 2011/0066550 A1 | 3/2011 | Shank et al. |
| 2011/0175707 A1* | 7/2011 | Chen .................. G06K 19/0702 340/10.1 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0218083 A1 | 8/2012 | Tuttle |
| 2012/0286037 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |

(56) References Cited

U.S. PATENT DOCUMENTS

| | | |
|---|---|---|
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

\* cited by examiner

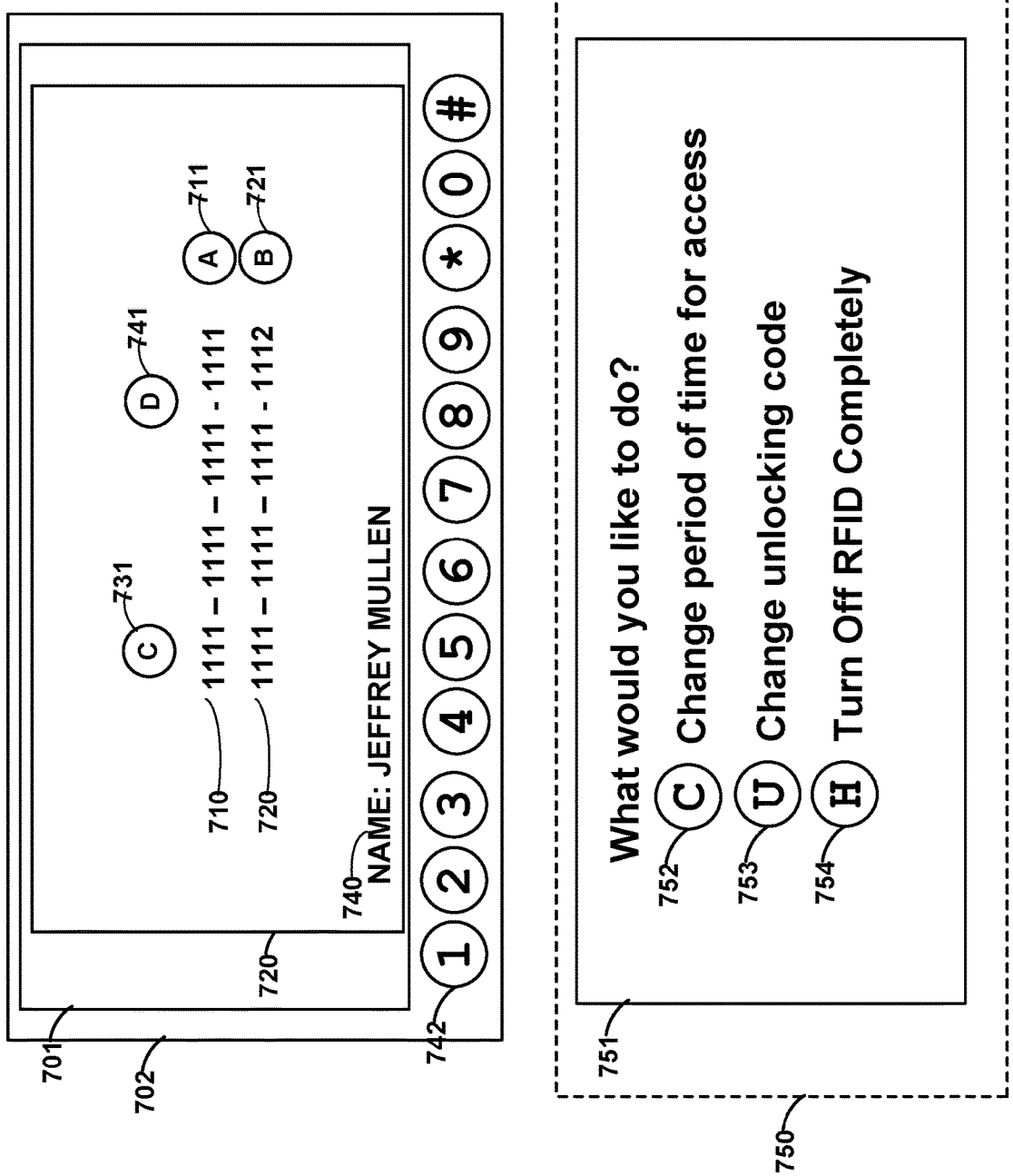

SYSTEMS AND METHOD FOR ANTI-SKIMMING RFID TOPOLOGIES

CROSS-REFERENCE TO RELATED APPLICATION

This application is a continuation of U.S. patent application Ser. No. 13/361,483, titled "SYSTEMS AND METHODS FOR ANTI-SKIMMING RFID TOPOLOGIES," filed Jan. 30, 2012, which claims the benefit of U.S. Provisional Patent Application No. 61/437,813, titled "SYSTEMS AND METHODS FOR ANTI-SKIMMING RFID TOPOLOGIES," filed Jan. 31, 2011, each of which is hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, and dynamic magnetic stripe devices). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a payment option. The code may be received by the card via manual input (e.g., onto buttons of the card).

A magnetic emulator may include a coil. Inside the coil, one or more strips of a material (e.g., a magnetic or non-magnetic material) may be provided. Outside of the coil, one or more strips of a material (e.g., a magnetic or non-magnetic material) may be provided.

A card may be formed by providing an electronic assembly between two layers of transparent polymer, injecting a liquid laminate between those two layers, and then hardening the liquid laminate. The liquid laminate may also be, for example, transparent. The liquid laminate may be hardened via, for example, a chemical, temperature, optical (e.g., UV or low-band blue light), or any other method.

An RFID antenna may be provided in a card, or other device. A mechanical button may be provided and may be mechanically coupled to a mechanical anti-skimming device. Such a mechanical anti-skimming device may mechanically move when the mechanical button is distorted. The movement of the mechanical anti-skimming device may cause, for example, the RFID antenna to either be operable to communicate data or not be operable to communicate data. Accordingly, a user may press the mechanical button to, for example, enable or disable an RFID. In doing so, a thief may not be able to communicate with the RFID while the user has the RFID antenna disabled for communication.

A mechanical anti-skimming device may be, for example, a piece of conductive material. The mechanical anti-skimming device may be moved mechanically, for example by the way of a mechanical button, into the proximity of an RFID antenna such that the anti-skimming device interferes with the operation of the RFID antenna to communicate data. In doing so, a card may be provided with a button, RFID antenna, and anti-skimming RFID device without the need of a battery. In this manner, a non-battery powered RFID card may be provided with anti-skimming technology obtained by the press of a button.

A battery powered card may include, for example, a mechanical anti-skimming device. The battery powered card may, for example, activate a light source (e.g., an LED) when the mechanical button is in a position indicative of the RFID antenna being operable to communicate data. As a result, for example, a user may receive a visual indication that the card is ready to be utilized for RFID communications.

Multiple sets of RFID data may be stored in a memory. Each set of RFID data may correlate, for example, to different accounts or options on a card. A user may select these different accounts or options by, for example, providing different manual input into the card (e.g., pressing different buttons). When a button is pressed, for example, the selected RFID data may be copied into a different memory. An RFID antenna may be provided to only read, for example, data from that different memory. Accordingly, for example, until the data is copied, that data may not be able to be communicated by an RFID antenna. Similarly, the different memory may be erased (e.g., after a period of time after a button is pressed or an RFID antenna is utilized to communicate data).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 7 is an illustration of a mobile device constructed in accordance with the principles of the present invention.

DETAILED DESCRIPTION OF THE INVENTION

Figure 1:
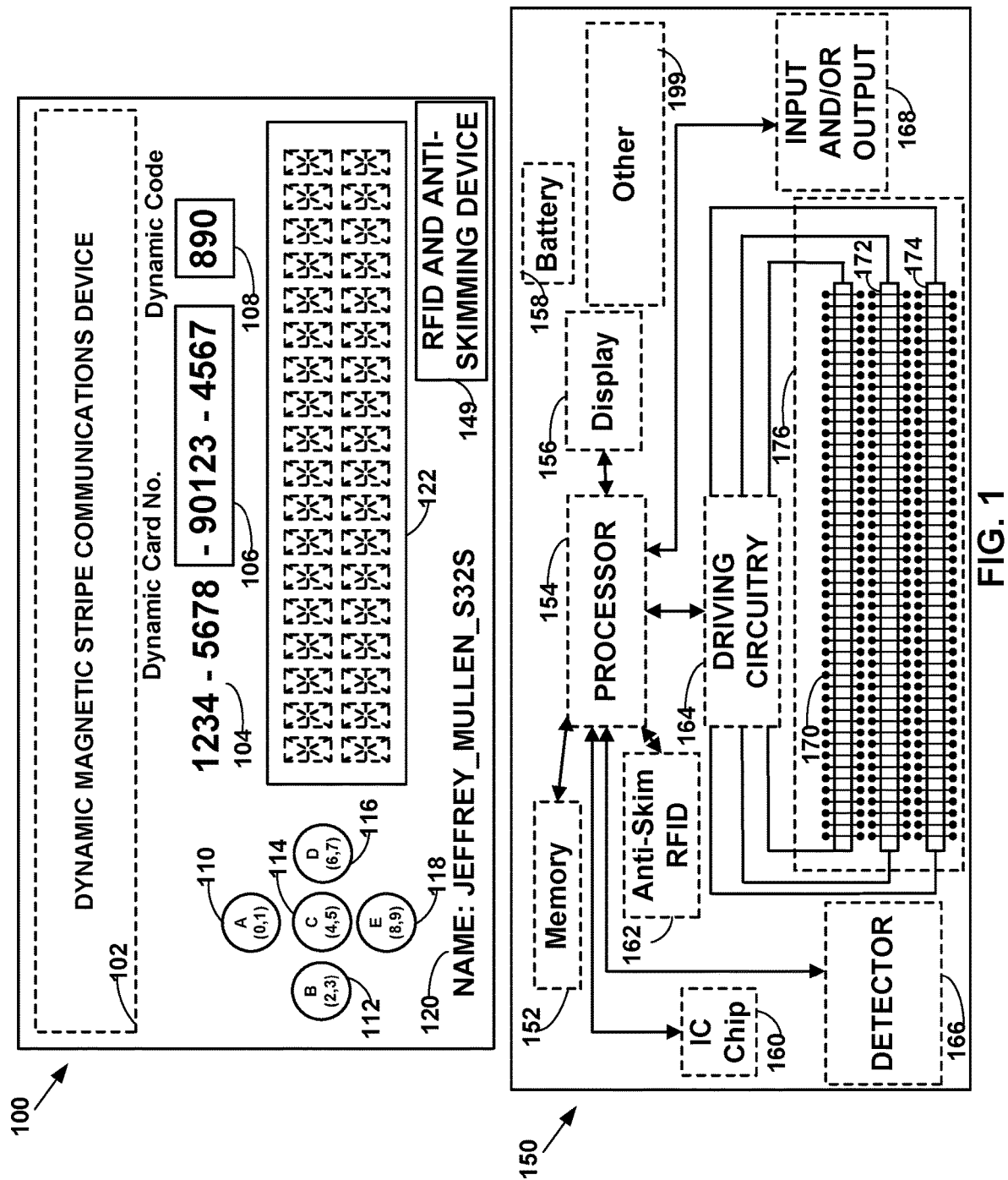
FIG. 1 is an illustration of cards constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card may 100 include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may be determined and processed by card 100 as data input.

RFID and anti-skimming device 149 may be provided in card 100. An RFID antenna may be provided. An anti-skimming device may be provided that disables and enables the RFID antenna from communicating data. Such a disablement and enablement may be, for example, mechanical in nature. For example, as a button is distorted, an anti-skimming device may be mechanically moved about an RFID antenna. Electronic topologies may be utilized to enable and disable data from being communicated from an RFID antenna. For example, data may be moved from one memory to another memory. An RFID antenna may be coupled to one of these memories such that, for example, the RFID antenna cannot communicate data when no data is provided in the memory accessible by the RFID antenna. A chip may be provided to enable access to the memory by the RFID antenna. Data may be erased after a period of time and may be copied into the memory upon a particular button press. Accordingly, a user may enable data from being communicated from the RFID upon, for example, a particular button press.

Card 100 may be implemented using architecture 150, which may include one or more processors 154. One or more processors 154 may be configured to utilize external memory 152, internal memory, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may, for example, be touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., provide particular data to processor 154). Displays 156 may have multiple locations that are able to be determined as being touched, or determined as being in proximity to an object.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power to a card (e.g., card 100 of FIG. 1) for a number of years (e.g., approximately 2 years). One or more batteries 158 may be included, for example, as rechargeable batteries.

Input and/or output devices may be implemented within architecture 150. For example, integrated circuit (IC) chip 160 (e.g., an EMV chip) may be included on card 100, that can communicate information with a chip reader (e.g., an EMV chip reader). Radio frequency identification (RFID) module 162 may be included within card 100 to enable the exchange of information between an RFID reader and card 100.

Other input and/or output devices 168 may be included within architecture 150, for example, to provide any number of input and/or output capabilities on card 100. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Dynamic magnetic stripe communications device 102 may be included on card 100 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between a card (e.g., card 100 of FIG. 1) and the various I/O devices implemented on a card (e.g., card 100 of FIG. 1) may be determined by a card (e.g., card 100 of FIG. 1). One or more detectors 166 may be utilized, for example, to sense the proximity, mechanical distortion, or actual contact, of an external device, which in turn, may trigger the initiation of a communication sequence. The sensed presence or touch of the external device may then be communicated to a controller (e.g., processor 154), which in turn may direct the exchange of information between a card (e.g., card 100 of FIG. 1) and the external device. The sensed presence, mechanical distortion, or touch of the external device may be effective to, for example, determine the type of device or object detected.

For example, the detection may include the detection of, for example, a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons (e.g., buttons 110-118 of FIG. 1), RFID 162, IC chip 160, electromagnetic field generators 170-174, and other input and/or output devices 168.

An anti-skimming RFID electronics package may be provided, for example, as device 162. Such an RFID electronics package may include, for example, an RFID antenna, an RFID antenna controller chip with memory, and/or an anti-skimming RFID device.

Figure 2:
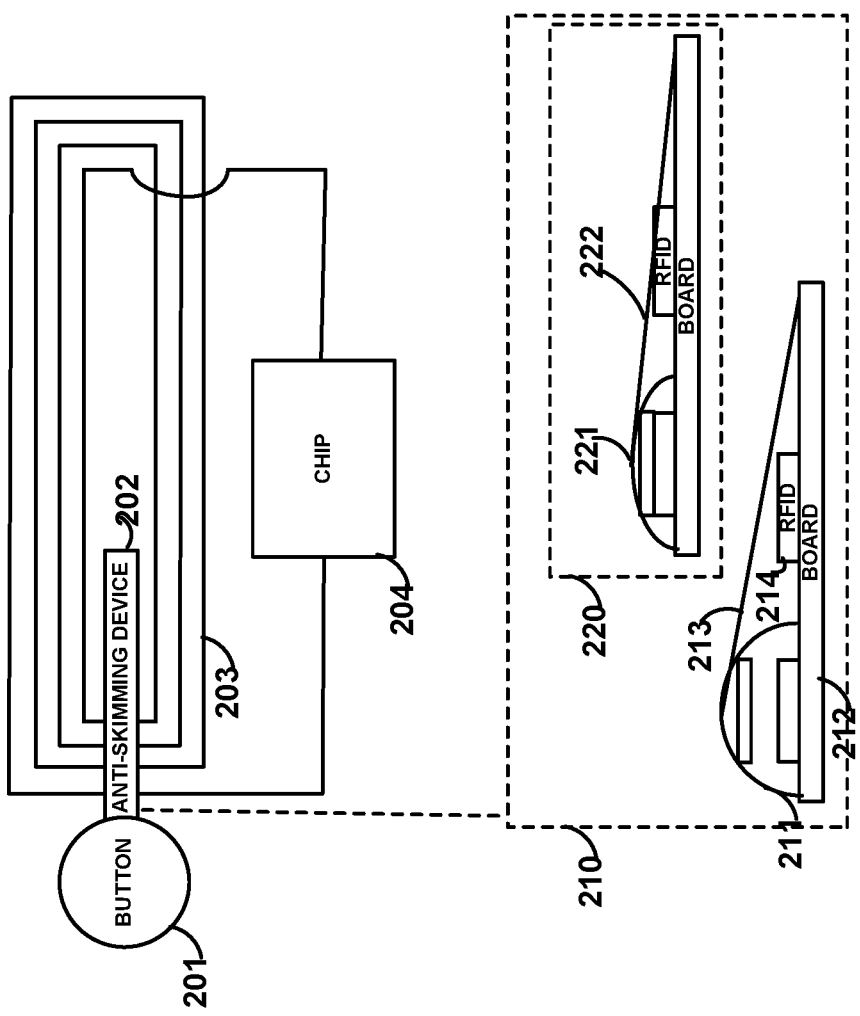
FIG. 2 is an illustration of an electronics package constructed in accordance with the principles of the present invention.

FIG. 2 shows electronic assembly 200 that may include, for example, button 201, anti-skimming device 202, RFID antenna 203, and chip 204. Chip 204 may include, for example, an embedded memory. Button 201 may be mechanically pressed which may, in turn, move anti-skimming device 202 into a position that may cause RFID antenna 203 to have difficulty communicating data stored on chip 204. Alternatively, for example, button 201 may be mechanically pressed which may, in turn, move anti-skimming device into a position that may not cause RFID antenna 203 to have difficulty communicating data stored on chip 204. In this manner, for example, RFID antenna 203 may not be operable to communicate data until, for example, button 201 is pressed.

Button configuration 210 may be provided in which button dome 211 may be provided on board 212. Anti-skimming device 213 may be coupled to board 212 and dome 211. RFID 214 may be provided away from anti-skimming device 213 such that RFID 214 may communicate data while dome 211 is not depressed. Configuration 220 may include, for example, a depressed dome 221 that may include anti-skimming device 222 that may be moved into a position that interferes with the communication of an RFID antenna. Anti-skimming device 222 may include, for example, a piece of conductive material such as a metal. An RFID antenna may be exposed such that the RFID antenna directly couples to, and shorts, when in contact with anti-skimming device 222. A dome may be provided about anti-skimming device 222 such that anti-skimming device 222 may more easily move in a laminated environment (e.g., a laminated card). A button may be configured such that pressing the button locks it into a depressed position and pressing the button again locks it into an undepressed position. An anti-skimming device may be constructed such that a depressed button allows an RFID to communicate information and a non depressed button does not allow an RFID to communicate information. Particularly, latches may be provided within a button that may mechanically distort under pressure to lock and unlock with an oppositely configured latch. Assembly 200 may, for example, not be coupled to a battery and, as such, may be utilized in a non-battery powered card.

Figure 3:
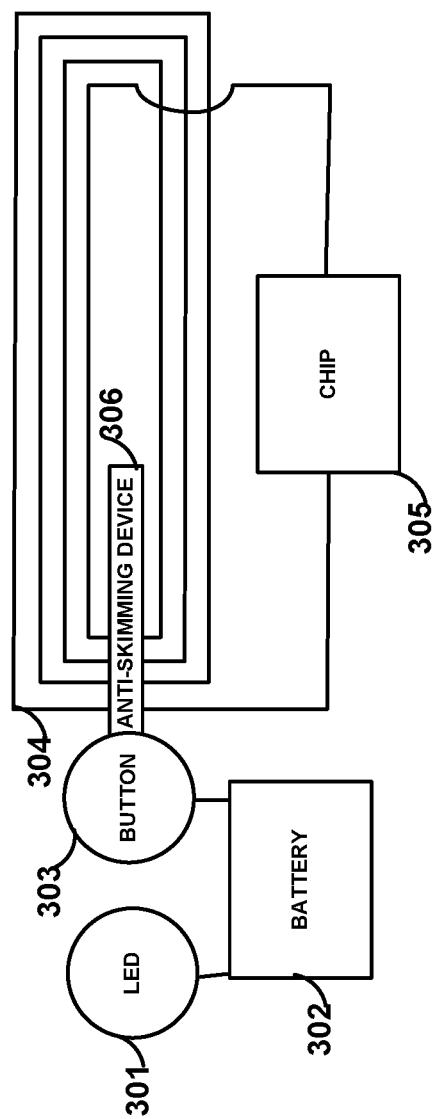
FIG. 3 is an illustration of an electronics package constructed in accordance with the principles of the present invention.

FIG. 3 shows electronic assembly 300 that may include, for example, light source 301, button 303, RFID antenna 304, anti-skimming device 306, chip 305, and battery 302. Electronic assembly 300 may be laminated into a card. LED 301 may turn ON when anti-skimming device 306 is provided in a position that allows antenna 304 to communicate data. LED 301 may be coupled to, for example, chip 305.

Persons skilled in the art will appreciate that light source 301 may be provided without battery 302. Light source 301 may be instead, for example, coupled to an inductive source of electrical energy. Such an inductive source of electrical energy may be powered, for example, by an RF source. Circuitry may be provided, for example, to power LED 301 from an RF source. LED 301 may be configured to turn ON if in the presence of an RF field so long as anti-skimming device 306 is in a position that allows antenna 304 to communicate data. Additional light sources may be provided, for example, to turn ON (e.g., via an RF source or a battery) to indicate to the user whether the anti-skimming device 306 is in a position where RFID 304 is not operable to communicate data (e.g., either in the presence of an RF field or in the presence of receiving energy from a battery).

Figure 4:
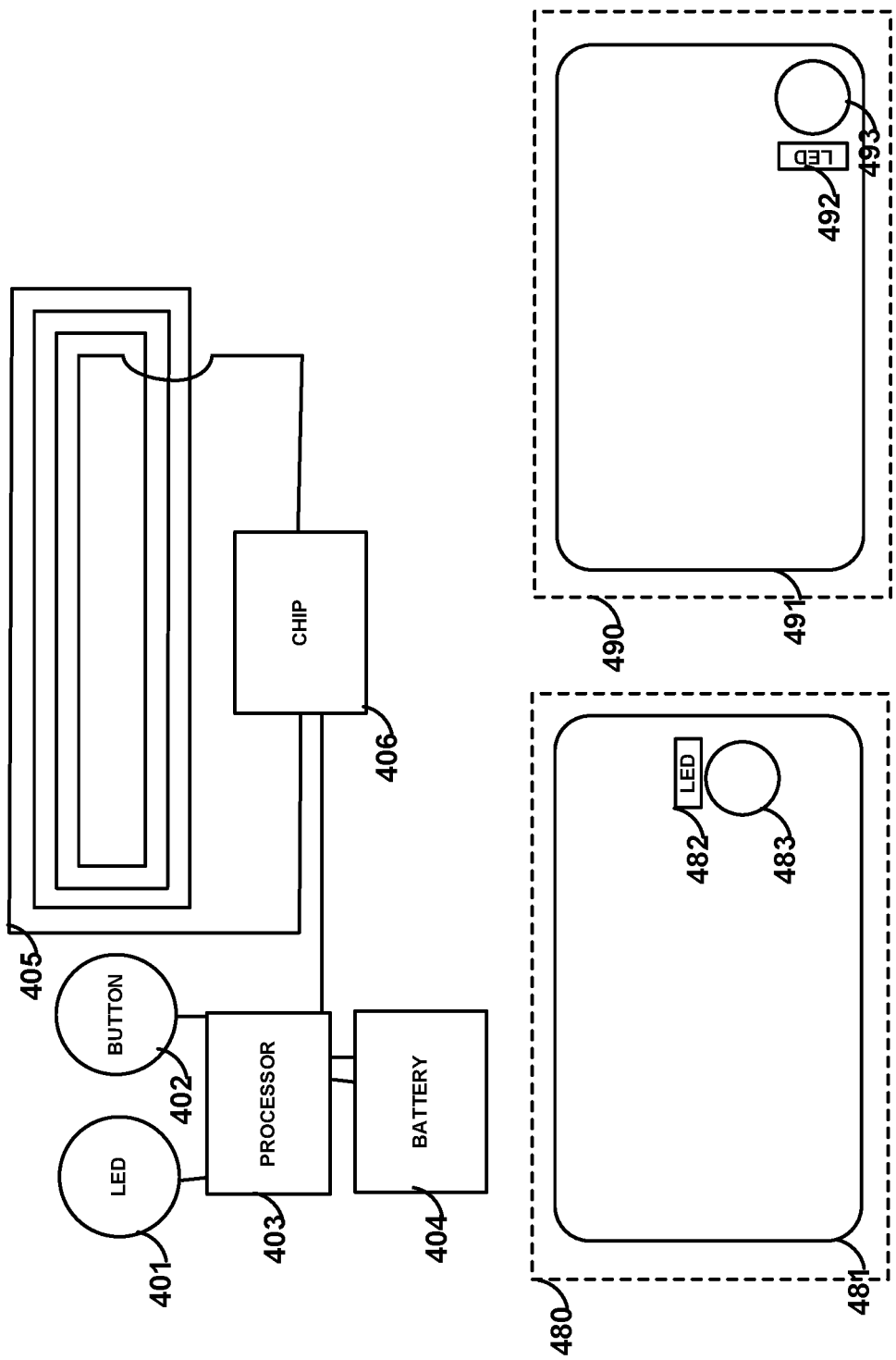
FIG. 4 is an illustration of an electronics package constructed in accordance with the principles of the present invention.

FIG. 4 shows electronics package 400 that may include, for example, light source 401, button 402, processor 403, battery 404, chip 406, and antenna 405. Persons skilled in the art will appreciate that processor 403 may be programmed with sets of RFID data and may load a desired RFID data into chip 406 when button 402 is pressed. This data may be erased, for example, after data is communicated from an antenna 405 (e.g., after an RF field is detected as being present and then detected as being removed). The data may be erased, for example, after a period of time after a button was pressed that caused data to be loaded into memory on chip 406.

Configuration 480 may be provided with card 481. An electronics package (e.g., electronics package 400 or electronics package 300 of FIG. 3) may be provided in configuration 480. A single button 483 may be provided with a single source of light 482 (e.g., an LED). Such a button and/or source of light may be provided to the right or left of an account number. Additional sources of light and/or buttons may be included in configuration 480.

Configuration 490 may be provided with card 491. An electronics package may be provided in configuration 490. A single button 493 may be provided with a single source of light 492. Such a button and/or source of light may be provided in the proximity of a corner of card 491 (or not in the proximity of a corner of a card as in configuration 480). Additional sources of light and/or buttons may be included in configuration 490.

Figure 5:
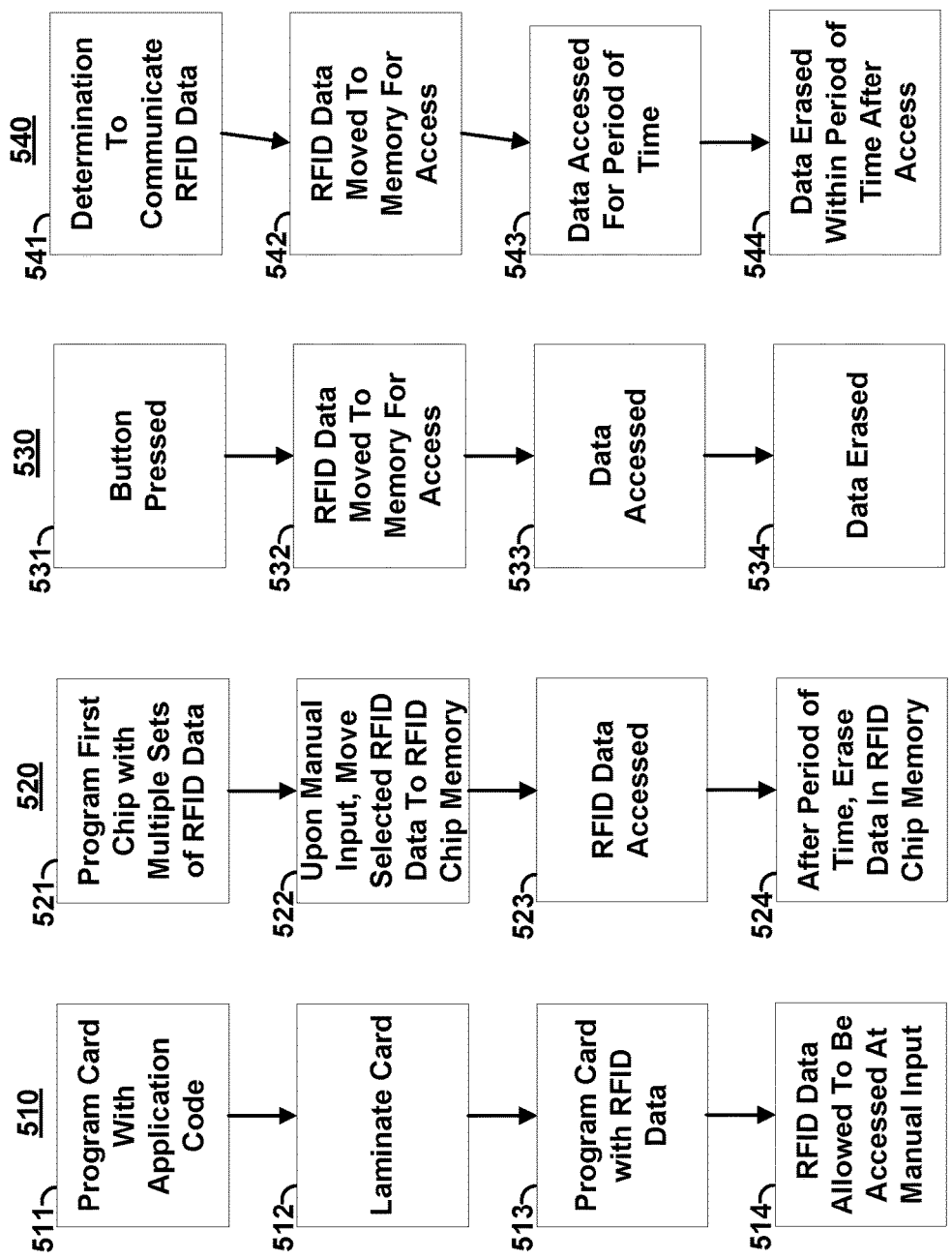
FIG. 5 is a flow chart of processes constructed in accordance with the principles of the present invention.

FIG. 5 shows process flow charts 510, 520, 530, and 540. Process flow chart 510 may be included, in which application code may be loaded into a card in step 511. A card may be laminated in step 512. The card may be programmed with RFID data in step 513. The RFID data may be allowed to be accessed at a manual input in step 514.

Process flow chart 520 may be included, in which multiple sets of RFID data may be programmed in step 521. Step 522 may be provided in which, for example, manual input may be received and selected RFID data may be loaded to memory in an RFID chip (or in another memory device or location). RFID data may be accessed in step 523. The RFID data in the RFID chip memory may be erased, for example, in step 524. This many occur, for example, after a period of time from when the button was first pressed to allow for data to be communicated from the RFID antenna.

Process flow chart 530 may be provided in which a button may be pressed in step 531. RFID data may be moved to memory for access in step 532. RFID data may be moved, for example, as a result of a button being pressed. Data may be accessed in step 533. Data may be accessed, for example, via an RFID reader. Data may be erased in step 534. Data may be erased, for example, after a button (e.g., the button that was pressed in step 531) is pressed or, for example, after data has been accessed.

Process flow chart 540 may be provided and may include, for example, step 541 which may determine, for example, that RFID is to be communicated. Such a determination may occur, for example, upon one or more button presses (e.g., a user enters a pre-determined code into a card or other device). RFID data may then be moved, for example, to a memory (e.g., memory of an chip associated with an RFID antenna such as an ASIC for driving an RFID antenna). Data may be accessed, for example, for a period of time in step 543. Such a period of time may, for example, be less than a minute, more than a minute, less than ten minutes. For example, such a period of time may be between 5 and 10 minutes. RFID data may be erased after such a period of time. If data is accessed, for example, data may be available for continued access for an additional period of time (e.g., between 10 seconds and 1 minute such as for approximately 20 seconds). This continued time period may repeat each time data is accessed. Data may be erased after this continued period of time without data being accessed. Persons skilled in the art will appreciate that one or more sources of light may be utilized to indicate to a user that data is available to be accessed. Such a source of light (e.g., an LED) may continuously emit light for an initial portion of a period of time (e.g., for approximately the first 30 to 90 seconds) and then may periodically emit light for a subsequent portion of period of time (e.g., for approximately 30 seconds to 8 minutes and 30 seconds). In doing so, for example, power may be conserved. More than one button may be included. A particular button may be associated with different RFID data. In this manner, a user may make different selections and different data may be communicated to an RFID reader. A card or other device (e.g., a mobile telephonic phone) may be utilized to communicate RFID data.

Figure 6:
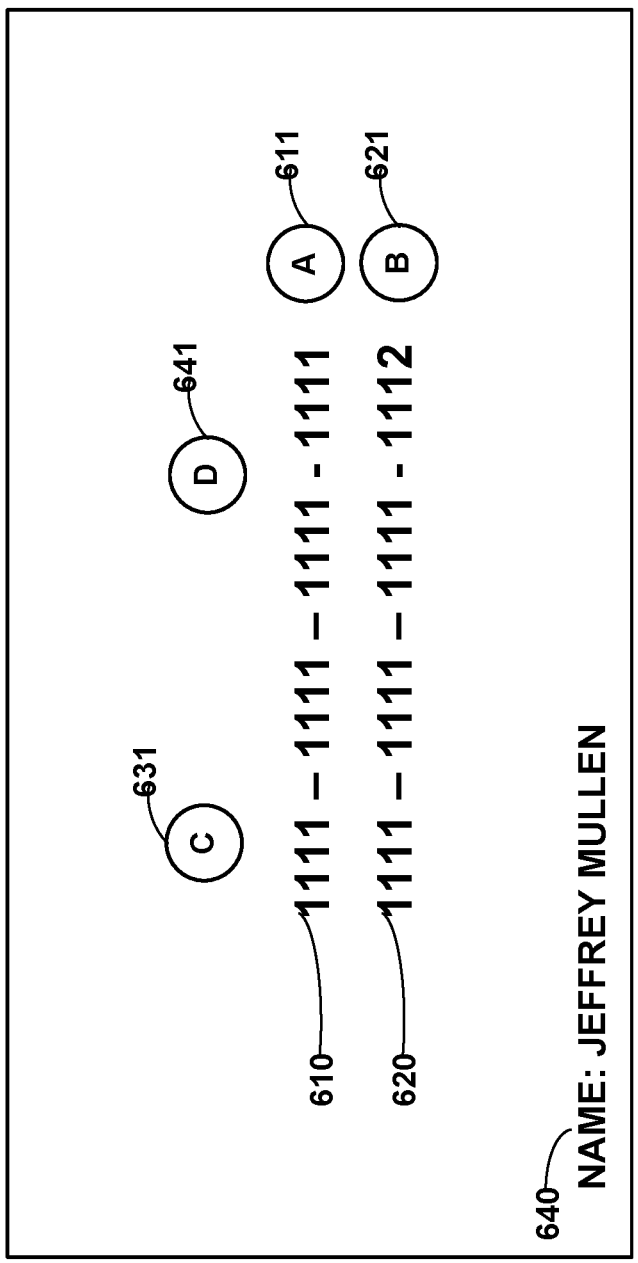
FIG. 6 is an illustration of a card constructed in accordance with the principles of the present invention.

FIG. 6 shows card 600 that may include, for example, an RFID antenna, RFID chip, and/or RFID anti-an skimming device. Batteries, buttons, exposed communication chips for chip readers, card-programmable magnetic stripes, microprocessors, and other electrical and mechanical components may be included in card 600. Card 600 may include, for example, printed name 640, account number 610, and account number 620. Button 611 may be pressed for an RFID to communicate RFID data associated with account 610. Button 621 may be pressed to communicate RFID data associated with account 620. Button 631 may be pressed with a particular account to communicate data for the selected account that corresponds to selected button 631. Button 641 may be pressed with a particular account to communicate data for the selected account that corresponds to selected button 641.

FIG. 7 shows mobile device 700 that may be, for example, a mobile telephonic device. Device 700 may include, for example, an RFID antenna, RFID chip, and/or RFID anti-an skimming device. Batteries, buttons, exposed communication chips for chip readers, pop-out extensions with card-programmable magnetic stripes, microprocessors, and other electrical and mechanical components may be included in device 700. Device 700 may display, for example, a virtual card, or other graphical user interface, with name 740, account number 710, and account number 720. Button 711 may be pressed for an RFID to communicate RFID data associated with account 710. Button 711, as well as button 721, may be, for example, a virtual button pressed via a capacitive sensor able to discern a user's touch on a display screen. Device 700 may include housing 702 having display 701 and buttons 742. Buttons 742 may be, for example, a mechanical button. Button 721 may be pressed to communicate RFID data associated with account 720. Button 731 may be pressed with a particular account to communicate data for the selected account that corresponds to selected button 731. Button 741 may be pressed with a particular account to communicate data for the selected account that corresponds to selected button 741.

Device 700 may display, for example, configuration 750 having graphical user interface 751. Graphical user interface may provide a user with option 752, option 753, and/or option 754. Option 752 may be utilized, for example, for a user to change his/her period of time that RFID data may be accessed after a determination is made to allow data access (e.g., after a button is pressed). Option 753 may be utilized to change an unlocking code should a device be configured to accept an unlocking code (e.g., a personal identification number) so RFID data can be accessed via an RFID antenna. Option 754 may be utilized to disable an RFID antenna so that the RFID antenna may not be utilized until the RFID is enabled by a user (e.g., via 754). In doing so, applications running on device 700 may, for example, not be able to access RFID data via an RFID antenna on the device even if the applications are configured to access an RFID to communicate with an external device (e.g., an external phone or device reader) as a result, for example, of a user turning the RFID OFF. Persons skilled in the art will appreciate that RFID communications may include, for example, near field communications (NFC).

Persons skilled in the art will also appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. An apparatus, comprising:
   a radio frequency identification (RFID) antenna;
   a mechanical button; and
   a device operable to interrupt the ability of the RFID antenna to communicate information when the button is mechanically distorted,
   wherein at least a portion of the device is outside the mechanical button,
   the mechanical button is operable to move the device, and
   a distance between the device and the RFID antenna is based on an amount of mechanical distortion of the mechanical button.
2. The apparatus of claim 1, further comprising a battery.
3. The apparatus of claim 1, further comprising a display.
4. The apparatus of claim 1, further comprising a dynamic magnetic stripe communications device.
5. The apparatus of claim 1, further comprising an exposed integrated circuit (IC) chip.
6. The apparatus of claim 1, further comprising a source of light.
7. The apparatus of claim 1, further comprising a second button.
8. An apparatus comprising:
   a radio frequency identification (RFID) antenna;
   a mechanical button; and
   a device operable to interrupt the ability of the RFID antenna to communicate information when the button is not mechanically distorted,
   wherein at least a portion of the device is outside the mechanical button,
   the mechanical button is operable to move the device, and
   a distance between the device and the RFID antenna is based on an amount of mechanical distortion of the mechanical button.
9. The apparatus of claim 8, further comprising a battery.
10. The apparatus of claim 8, further comprising a display.
11. The apparatus of claim 8, further comprising a dynamic magnetic stripe communications device.
12. The apparatus of claim 8, further comprising an exposed integrated circuit (IC) chip.
13. The apparatus of claim 8, further comprising a source of light.
14. The apparatus of claim 8, further comprising a second button.
15. The apparatus of claim 1, further comprising:
    a board,
    wherein the device is connected to the board.
16. The apparatus of claim 8, further comprising:
    a board,
    wherein the device is connected to the board.
17. An apparatus comprising:
    a radio frequency identification (RFID) antenna;
    a mechanical button; and
    a device operable to interrupt the ability of the RFID antenna to communicate information based on distortion of the button, at least a portion of the device being outside the mechanical button.
18. An apparatus comprising:
    a radio frequency identification (RFID) antenna;
    a board;
    a mechanical button; and
    a device operable to interrupt the ability of the RFID antenna to communicate information based on distortion of the button, the device connected to the board at a connection, wherein the connection is at a distance from the button.

* * * * *